June 4, 1968  J. L. GIOVANNUCCI  3,386,221

LIGHTWEIGHT PANEL

Filed Sept. 8, 1967

*INVENTOR.*
Julius L. Giovannucci
BY
Pennie, Edmonds, Norton, Taylor and Adams
ATTORNEYS

United States Patent Office 3,386,221
Patented June 4, 1968

3,386,221
LIGHTWEIGHT PANEL
Julius L. Giovannucci, Rome, N.Y., assignor to Revere Copper and Brass Incorporated, Rome, N.Y., a corporation of Maryland
Continuation-in-part of application Ser. No. 425,225, Jan. 13, 1965. This application Sept. 8, 1967, Ser. No. 666,424
1 Claim. (Cl. 52—586)

ABSTRACT OF THE DISCLOSURE

An extensible structural panel system in which web-supported thin skin members of interconnected panels are provided with thickened portions extending beyond the endmost webs to form rigid channels which are joined by a snugly-fitting rectilinear coupling member the end portions of which are spaced apart by a lesser distance than that between the webs forming the bases of opposing channels when the edges of the thus-connected panels are in abutment.

Figure 1:
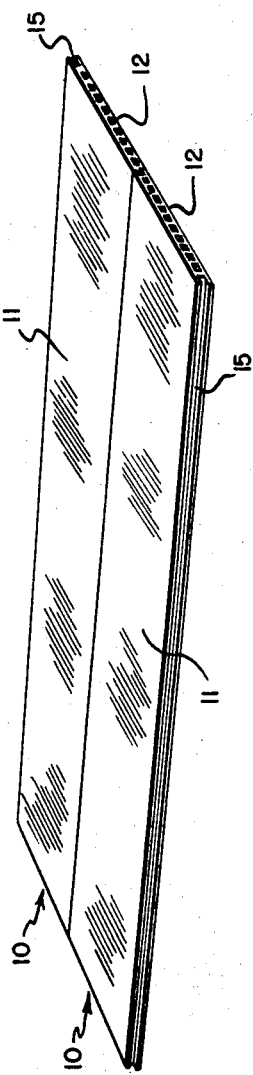

This application is a continuation-in-part of my co-pending application Ser. No. 425,225, filed Jan. 13, 1965 and now abandoned.

The present invention relates to lightweight high strength structural paneling, and in particular it relates to a system of interconnected extruded aluminum panels of the so-called honeycomb panel type capable of forming large rigid planar structures.

A well-known type of composite structural panel that combines high strength with low weight comprises two substantially parallel outer sheets or skin members separated from each other by a lightweight center core that is secured to the inner surfaces of the outer skins. This type of panel is frequently employed as a structural element in aircraft, ships and the like where its inherent properties of high strength and low weight are highly desirable. Such lightweight panels are customarily fabricated from sheets of relatively thin gauge metal, the two outer metal sheets or skins generally being connected by an inner "honeycomb" core structure formed from the same material that is brazed or otherwise secured to the inner surfaces of the two skins or is formed from a dissimilar material to which the skins are secured by an adhesive or the like.

The fabrication of a conventional honeycomb panel can be both difficult and expensive. For example, the inner core must first be fabricated and then assembled with the two outer skins to form the composite honeycomb structure, and then the three parts of the composite must be firmly secured or bonded together by a brazing or welding operation or the like. Problems inherent in the complicated fabricating, assembly and bonding operations make it difficult to eliminate minor imperfections in the final product. Moreover, when a number of conventional honeycomb panels are being assembled edge-to-edge to form a larger structure (such as a wall or a floor), the smooth and efficient joining of abutting edges of the panels presents many problems difficult to solve.

I have now developed a new lightweight panel of the so-called honeycomb type that overcomes or eliminates many of the problems and limitations that are inherent in honeycomb panels of conventional construction. In particular, my new honeycomb panel system comprises a plurality of lightweight extruded aluminum panels and at least one rigid tubular aluminum coupling member connected to said panels along at least one longitudinal edge of each of said panels and substantially coextensive therewith. Each of the extruded aluminum panels comprises parallel spaced skin members and a plurality of longitudinally extending spaced web members integrally formed with and connecting the two skin members in a substantially lattice-like configuration. The skin members are of sufficient thickness that they cooperate with the webs to impart the required structural rigidity to the panel. At least one edge of the panel is formed with a longitudinal channel defined by opposing edge portions of the skin members and the longitudinal web member adjacent said edge portions, these edge portions of the skin members having a thickness at least 25% greater than the remaining portions thereof and being provided with a beveled lead-in at their proximal outboard edges. The tubular aluminum coupling member has a closed rectilinear shape with two of its opposite planar surfaces spaced apart a distance such that they are adapted to be inserted closely between the inner surfaces of said edge portions of the panel skin members and with its other two opposite planar surfaces spaced apart a distance less than that between the channel-forming web members of the connected panels when the outboard edges of the connected panels are in abutment.

Figure 2:
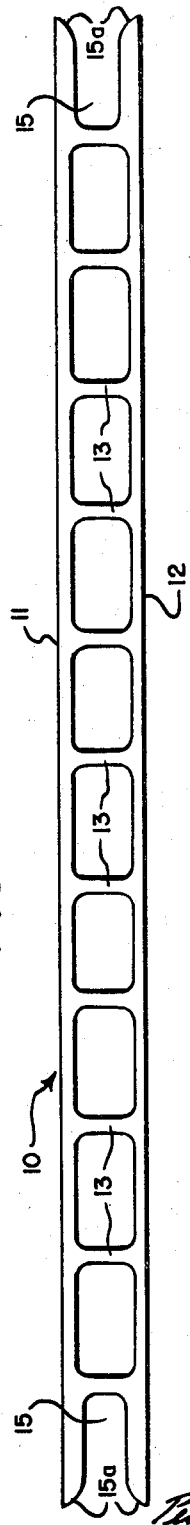
Figure 3:
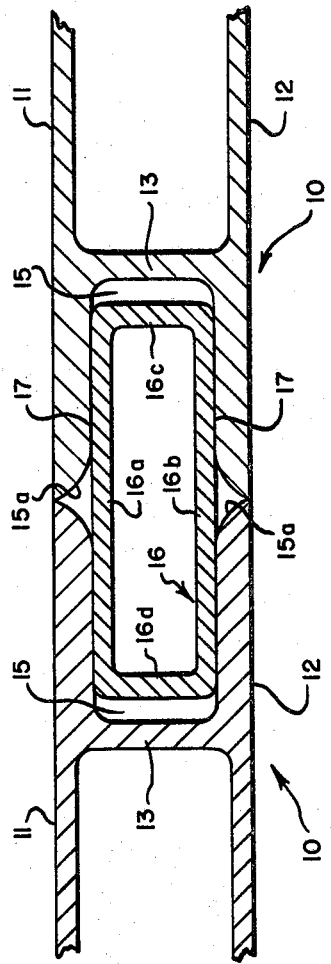

My new panel construction will be better understood from the following description thereof taken in connection with the accompanying drawing of which FIG. 1 is a perspective view of two of my new panels disposed edge to edge to form a larger structural unit, FIG. 2 is an end elevation of my new extruded panel showing the ladder-like configuration thereof, and FIG. 3 is a fragmentary sectional view showing the joining of abutting longitudinal edges of two panels together pursuant to the invention.

My new honeycomb panel is integrally extruded in one piece by conventional aluminum extrusion techniques, a typical panel being in the order of 7 feet in length, 1 foot in width and 1 inch in over-all thickness. two such panels 10 are shown joined edge to edge in FIG. 1 of the drawing.

As shown best in FIG. 2, my lightweight extruded aluminum panel 10 comprises a first outer skin member 11, a second outer skin member 12 substantially parallel to and spaced apart from the first outer skin member 11 by a plurality of longitudinally extending web members 13 integrally formed with the two outer skin members in the course of the extrusion of the panel. The longitudinal web members 13 are spaced substantially equidistant from each other. The two substantially parallel outer skin members 11 and 12 and the plurality of equi-spaced longitudinal web members 13 disposed therebetween together present a unique ladder-like honeycomb configuration when viewed from one end as clearly shown in FIG. 2. The integrally formed panel of my invention possesses an unusually high strength-to-weight ratio. The outer skin members 11 and 12 are of sufficient thickness that they cooperate with the web members 13 and impart the required structural rigidity to the panels so that they resist bending forces.

At least one longitudinal edge of the panel 10 is formed with a longitudinal channel 15 defined by the adjacent edge portions of the two outer skin members 11 and 12 and the web member 13 adjacent the longitudinal edge. The longitudinal channels 15 formed along the longitudinal edges of the panels of my invention facilitate rigid and smooth edge to edge joining of two adjoining panels. For this purpose, the projecting edge portions of the skin members are provided with a thickness at least 25% greater than that of the remainder thereof and are further provided with a beveled lead-in 15a at their proximate outboard edges. To effect the edge-to-edge juncture of two adjoining panels, a tubular coupling member 16 is advantageously formed of extruded aluminum or is formed from sheet metal having a locked, crimped or brazed joint so as to form a closed rectilinear shape having the rigidity of a simple tubular shape. The coupling member is inserted into the longitudinal channels 15 of the adjoining panels as shown in FIG. 3. The opposite planar surfaces 16a and 16b engaging the projecting edges of the skin members 11 and 12 are so spaced that they fit snugly, but not necessarily tightly, therebetween and the other two opposite planar surfaces 16c and 16d are spaced apart a distance less than that between the channel-forming web members of the connected panels when the outboard edges of the connected panels are in abutment. The resulting juncture effected between adjoining edges of the two panels may be of a temporary nature in which case the tubular coupling member 16 is held in the longitudinal channels 15 mainly by frictional forces, or the juncture can be made permanent by welding or otherwise permanently securing the tubular coupling member 16 in place in the longitudinal channels 15 of the two adjoining panels. In either event, the connected panels offer sufficient rigidity to permit the formation of large planar structures requiring no extraneous lateral support.

It will be appreciated, accordingly, that the panel system of the invention offers structural rigidity with light weight. The honeycomb structure of the panels permits their extrusion from aluminum, and the web members being integrally formed with the skin members permit the use of thin skin members without sacrificing rigidity. The extra thickness of the channel-forming portions of the skin members insures rigidity along the interconnection of the panels, and the lead-in at the edges of these portions permits insertion of the connectors to form a snug fit. The fact that the connector is of closed rectilinear shape imparts rigidity to the connector by preventing the "give" which is characterized by open connector structures having a channel shape. The size of the connector is further such that, when it is inserted between adjoining panels, and the panel edge portions are in abutment, the surfaces of the connector facing the channel-base webs 13 are spaced from the webs so as not to interfere with alignment of the panels or with their abutment.

I claim:

1. An extendible panel system of extruded aluminum parts assembled with other components to form large rigid planar structures, said system comprising a plurality of light weight extruded aluminum panels and at least one rigid tubular aluminum coupling member connected to said panels along at least one longitudinal edge of each of said panels and substantially coextensive therewith, each of said extruded aluminum panels comprising parallel spaced skin members and a plurality of longitudinally extending spaced web members integrally formed with and connecting the two skin members in a substantially lattice-like configuration, the skin members being of sufficient thickness that they cooperate with the webs to impart the required structural rigidity to the panel, at least one edge of the panel being formed with a longitudinal channel defined by opposing edge portions of the skin members and the longitudinal web member adjacent said edge portions, said edge portions of the skin members having a thickness at least 25% greater than the remaining portions thereof, and being provided with a beveled lead-in at their proximal outboard edges, and said tubular aluminum coupling member having a closed rectilinear shape with two of its opposite planar surfaces spaced apart a distance which substantially corresponds to the distance between the inner surfaces of the thickened edge portions such that they are frictionally gripped between the inner surfaces of said edge portions of the panel skin members, the other two opposite planar surfaces of the tubular coupling member being spaced apart a distance substantially less than that between the channel-forming web members of the connected panels whereby a space exists between at least one of said other planar surfaces and said web members.

References Cited

UNITED STATES PATENTS

| | | | |
|---|---|---|---|
| 1,841,233 | 1/1932 | Whiting | 52—595 |
| 2,457,129 | 12/1948 | Collings | 52—627 |
| 2,630,604 | 3/1953 | Marsh | 52—573 |
| 3,192,671 | 7/1965 | Smith | 52—586 |
| 3,301,147 | 1/1967 | Clayton et al. | 52—588 |

HENRY C. SUTHERLAND, *Primary Examiner.*